US011949147B2

(12) United States Patent
Greaney et al.

(10) Patent No.: US 11,949,147 B2
(45) Date of Patent: Apr. 2, 2024

(54) INTEGRATED HEATSINK AND ANTENNA STRUCTURE

(71) Applicant: VEEA Inc., New York, NY (US)

(72) Inventors: Shaun Joseph Greaney, Freehold, NJ (US); Michael Liccone, Scotch Plains, NJ (US); Michael Mirabella, New York, NY (US); Theodore Lubbe, New York, NY (US); Dave Doyle, New York, NY (US); Bob Migliorino, Wayne, NJ (US); Perry Wintner, New York, NY (US); Clint Smith, New York, NY (US)

(73) Assignee: VEEA INC., New York, NY (US)

( * ) Notice: Subject to any disclaimer, the term of this patent is extended or adjusted under 35 U.S.C. 154(b) by 0 days.

(21) Appl. No.: 18/086,069

(22) Filed: Dec. 21, 2022

(65) Prior Publication Data

US 2023/0126145 A1 Apr. 27, 2023

Related U.S. Application Data

(63) Continuation of application No. 17/110,744, filed on Dec. 3, 2020, now Pat. No. 11,563,262.

(Continued)

(51) Int. Cl.
*H01Q 1/02* (2006.01)
*H01Q 1/44* (2006.01)

(52) U.S. Cl.
CPC ................. *H01Q 1/02* (2013.01); *H01Q 1/44* (2013.01)

(58) Field of Classification Search
CPC H01Q 1/02; H01Q 1/44; H01Q 1/246; H01Q 9/0421
See application file for complete search history.

(56) References Cited

U.S. PATENT DOCUMENTS 10,283,849 B2 * 5/2019 Hirata ...................... H04B 1/38
10,621,503 B1 4/2020 Mueller et al.

(Continued)

FOREIGN PATENT DOCUMENTS

WO 2010148019 A2 12/2010
WO 2017033573 A1 3/2017
WO 2017086377 A1 5/2017

OTHER PUBLICATIONS

International Preliminary Report on Patentability and the Written Opinion of the International Searching Authority received from the The International Bureau of WIPO in related International Application No. PCT/US2020/063548 dated May 17, 2021.

(Continued)

*Primary Examiner* — Hoang V Nguyen
(74) *Attorney, Agent, or Firm* — THE MARBURY LAW GROUP, PLLC

(57) ABSTRACT

An integrated heatsink and antenna structure that is suitable for inclusion in small and midsized computing devices. The integrated heatsink and antenna structure may include a plurality of fin components that dissipate thermal energy integrated into a heatsink base and a plurality of radio frequency antenna portions coupled to and surrounded by the fin components. The plurality of radio frequency antenna portions may form a monopole antenna. The heatsink base may operate as a ground reference for each of the plurality of the antenna portions and to improve an omnidirectional pattern of each of the plurality of the antenna portions.

18 Claims, 11 Drawing Sheets

Related U.S. Application Data

(60) Provisional application No. 62/945,444, filed on Dec. 9, 2019.

(56) References Cited

U.S. PATENT DOCUMENTS

| | | | |
|---|---|---|---|
| 2013/0222201 | A1 | 8/2013 | Ma et al. |
| 2018/0219277 | A1 | 8/2018 | Hirata et al. |
| 2018/0342784 | A1 | 11/2018 | Samardzija et al. |
| 2020/0396871 | A1 | 12/2020 | Yun et al. |

OTHER PUBLICATIONS

International Search Report and the Written Opinion of the International Searching Authority received from the European Patent Office in related International Application No. PCT/US2020/063548 dated Mar. 19, 2021.

Office Action received from the European Patent Office from related patent application No. EP 20829134.4-1205 dated Jul. 22, 2022, 3 pages.

* cited by examiner

INTEGRATED HEATSINK AND ANTENNA STRUCTURE

RELATED APPLICATIONS

This application in a continuation of U.S. patent application Ser. No. 17/110,744 entitled "Integrated Heatsink and Antenna Structure" filed on Dec. 3, 2020, which claims the benefit of priority to U.S. Provisional Application No. 62/945,444, entitled "Integrated Heatsink and Antenna Structure" filed Dec. 9, 2019, the entire contents of all which are hereby incorporated by reference for all purposes.

BACKGROUND

Wireless communication technologies have been growing in popularity and use over the past several years. This growth has been fueled by better communications hardware, larger networks, and more reliable protocols. Wireless and Internet service providers are now able to offer their customers with an ever-expanding array of features and services, such as robust cloud-based services. To better support these enhancements, more powerful consumer facing edge devices (e.g., routers, switches, etc.) are beginning to emerge. These devices include more powerful processors, system-on-chips (SoCs), memories, antennas, power amplifiers, and other resources (e.g., power rails, etc.) that better support high-speed wireless communications and execute complex and power intensive applications facilitating edge computing.

As more functions and capabilities are added to edge devices, the amount of power consumed and dissipated by the devices increases. Power dissipation becomes more acute when the device is reduced in physical size, which reduces the horizontal and vertical surface area that is available for dissipating thermal energy or heat. Further, many edge devices are deployed or used in environments that prevent the use of (or reduce the effectiveness of) thermal management solutions that require forced airflow (e.g., via a fan, etc.) or cold intake air.

As a result, high performance edge devices, which generate a significant amount of heat, are often shaped to dissipate heat (e.g., are shaped as a quadrilateral cuboid having two elongated faces/sides, etc.) and/or include large casings that house large heat sinks. Yet, purchasers and users of consumer facing edge devices increasingly demand that their device comply with certain size and/or physical design requirements. That is, in addition to high performance and functionality, consumers increasingly demand that their devices have an attractive form factor and a small size that allows the device to be readily placed throughout a home or small office.

BRIEF DESCRIPTION OF THE DRAWINGS

The accompanying drawings, which are incorporated herein and constitute part of this specification, illustrate exemplary aspects of the claims, and together with the general description given above and the detailed description given below, serve to explain the features of the claims.

DETAILED DESCRIPTION

Figure 1A:
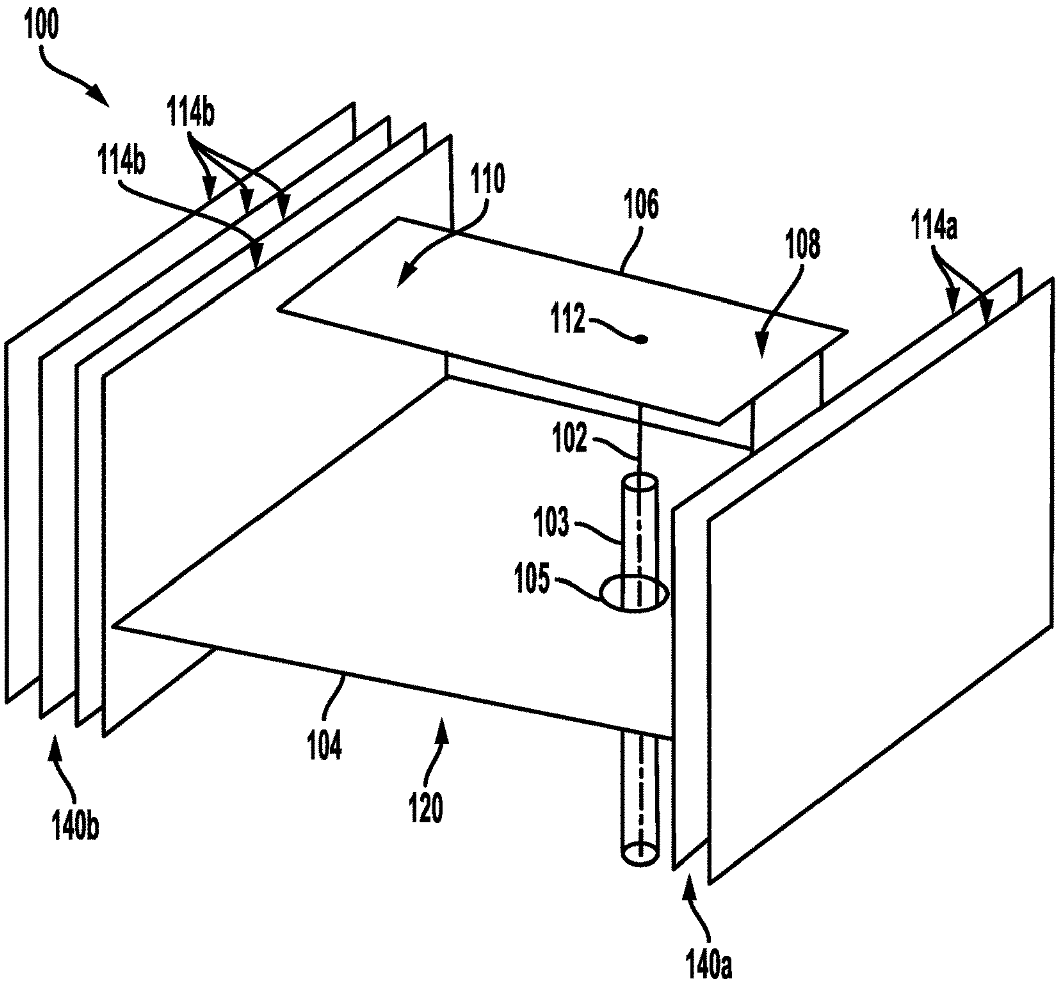
FIG. 1A is a schematic isometric view of an integrated heatsink and antenna structure in accordance with various embodiments.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Generally, components and circuitry within a computing device (e.g., wireless access point, router, edge device, router, etc.) generate heat or thermal energy, which at excessive levels could have a significant negative impact on the performance and functioning of the computing device. The amount of thermal energy that is generated may depend upon the components included in the computing device, operating conditions, and/or the operations or activities in the computing device. For example, a computing device that wirelessly transmits data for a sustained time period at a high power-level may require that a power amplifier feed the antenna. The power amplifier may generate a significant amount of thermal energy that could have a negative impact on the performance of the computing device. As another example, processors and other components in the computing device generate a significant amount thermal energy when the performing complex tasks, such as video processing, cryptography, or machine learning. The thermal energy generated by these processors/components could have a significant negative impact on the performance and functioning of the computing device.

Many modern computing systems are equipped with heat dissipating structures that help ensure the device does not operate at unsafe temperatures that damage or shorten the operating life of the device. Modern computing systems are often also equipped with radiating structures (antennas) for sending and receiving wireless communications.

In many conventional systems, the heat dissipating structures are separate and independent of radiating structures, and thus compete with one another for product volume (e.g., space with in the device). For these and other reasons, device manufacturers have had to either build devices that are large enough to include both the heat dissipating and radiating structures (e.g., personal computers, laptops, routers, etc.) or build smaller but less powerful devices (e.g., smartphones, IoT devices, etc.) that attempt to balance tradeoffs between performance and power consumption. Device manufacturers that opt to build the small and mid-sized devices often carve away sections of the heat dissipating structure (heatsinks) to make room for the radiating structures (antennas), or vice versa. The tradeoff or reduction in heat dissipation structure size for antenna installation reduces the thermal performance of the device because it decreases the surface area of the heat dissipating structure. This also degrades the radiation patterns on the radiating structures and may otherwise have a negative impact on the device's performance or reliability.

The various embodiments include an integrated heatsink and antenna structure that is suitable for inclusion in small and midsized computing devices and which overcomes the above-described limitations of conventional solutions. The integrated heatsink and antenna structure may include heatsink portions and radio frequency antenna portions. The heatsink portions may provide a path for dissipating thermal energy or heat generated by the components in the device (e.g., printed circuit boards, processors, voltage amplifiers, etc.), and the radio frequency (RF) antenna portions may allow the device to send and receive wireless communications.

In the embodiments, the integrated heatsink and antenna structure may be formed so that radio frequency antenna portions operate to improve the thermal performance of the heatsink portions and/or so that the heatsink portions operate to improve the antenna properties (e.g., radiation patterns, radiation efficiency, bandwidth, input impedance, polarization, directivity, gain, beam-width, voltage standing wave ratio, etc.) of the radio frequency antenna portions. These improvements in thermal performance and/or antenna properties may allow device manufacturers to build more powerful small and midsized devices that provide robust functionality (e.g., via additional antennas, more powerful processors that generate more heat, etc.) and which may be formed into more visually appealing shapes.

The various embodiments may include, use, incorporate, implement, provide access to a variety of wired and wireless communication networks, technologies and standards that are currently available or contemplated in the future, including any or all of Bluetooth®, Bluetooth Low Energy, ZigBee, LoRa, Wireless HART, Weightless P, DASH7, RPMA, RFID, NFC, LwM2M, Adaptive Network Topology (ANT), Worldwide Interoperability for Microwave Access (WiMAX), WIFI, WiFi6, WIFI Protected Access I & II (WPA, WPA2), personal area networks (PAN), local area networks (LAN), metropolitan area networks (MAN), wide area networks (WAN), networks that implement the data over cable service interface specification (DOCSIS), networks that utilize asymmetric digital subscriber line (ADSL) technologies, third generation partnership project (3GPP), long term evolution (LTE) systems, LTE-Direct, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), etc. Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The term "computing device" may be used herein to refer to any one or all of quantum computing devices, edge devices, Internet access gateways, modems, routers, network switches, residential gateways, access points, integrated access devices (IAD), mobile convergence products, networking adapters, multiplexers, personal computers, laptop computers, tablet computers, user equipment (UE), smartphones, personal or mobile multi-media players, personal data assistants (PDAs), palm-top computers, wireless electronic mail receivers, multimedia Internet enabled cellular telephones, gaming systems (e.g., PlayStation™, Xbox™, Nintendo Switch™, etc.), wearable devices (e.g., smartwatch, head-mounted display, fitness tracker, etc.), IoT devices (e.g., smart televisions, smart speakers, smart locks, lighting systems, smart switches, smart plugs, smart doorbells, smart doorbell cameras, smart air pollution/quality monitors, smart smoke alarms, security systems, smart thermostats, etc.), media players (e.g., DVD players, ROKU™, AppleTV™, etc.), digital video recorders (DVRs), and other similar devices that include a programmable processor and communications circuitry for providing the functionality described herein.

The term "quantum computing device" may be used herein to refer to a computing device or edge device, whether it is a standalone device or used in conjunction with current computing processes, that generates or manipulates quantum bits (qubits) or which utilizes quantum memory states. A quantum computing device may enhance edge computing capability by providing solutions that would be challenging to implement via conventional computing systems. This is especially true with value added computing for leveraging a diverse amount of senor and other input data to arrive at a solution in real time. Through unifying diverse data sources a quantum computing solution at the edge may accelerate machine learning, solve complex problems faster as well as provide the fundamental platform for artificial intelligence nodes at the edge of the network. With the vast array of data delivered by sensors as well state information the quantum computing process may improve the memory allocation though the use of superposition allowing for more information to be simultaneously stored and processed.

The term "edge device" may be used herein to refer to a computing device that includes a programmable processor and communications circuitry for establishing communication links to consumer devices (e.g., smartphones, UEs, IoT devices, etc.) and/or to network components in a service provider, core, cloud, or enterprise network. For example, an edge device may include or implement functionality associated any one or all of an access point, gateway, modem, router, network switch, residential gateway, mobile convergence product, networking adapter, customer premise device, multiplexer and/or other similar devices.

Various different types of antennas are available or contemplated in the future. To focus the discussion on the most important details, some embodiments are described with reference to planar inverted-F antennas. However, nothing in this application should be used to limit the scope of the claims to a specific type antenna unless expressly recited as such in the claims.

Generally, components and circuitry within a computing device generate heat or thermal energy, which at excessive levels may damage or reduce the performance of the computing device. The amount of thermal energy that is generated may vary depending upon the components included in the computing device, operating conditions, and/or the operations or activities in the computing device. For example, a computing device that wirelessly transmits data for a sustained time period at a high power-level may require that a power amplifier feed its antennas. The power amplifier may generate a significant amount of thermal energy that could have a negative impact on the performance of the computing device. As another example, processors and other components in the computing device generate a significant amount thermal energy when the performing complex tasks, such as processing video, using cryptographic technology, or implementing machine learning. The thermal energy generated by these processors/components could damage the device, shorten the operating life of the device, cause the device to abruptly shut down, or otherwise have a negative impact on the device's reliability or performance characteristics.

Figure 1B:
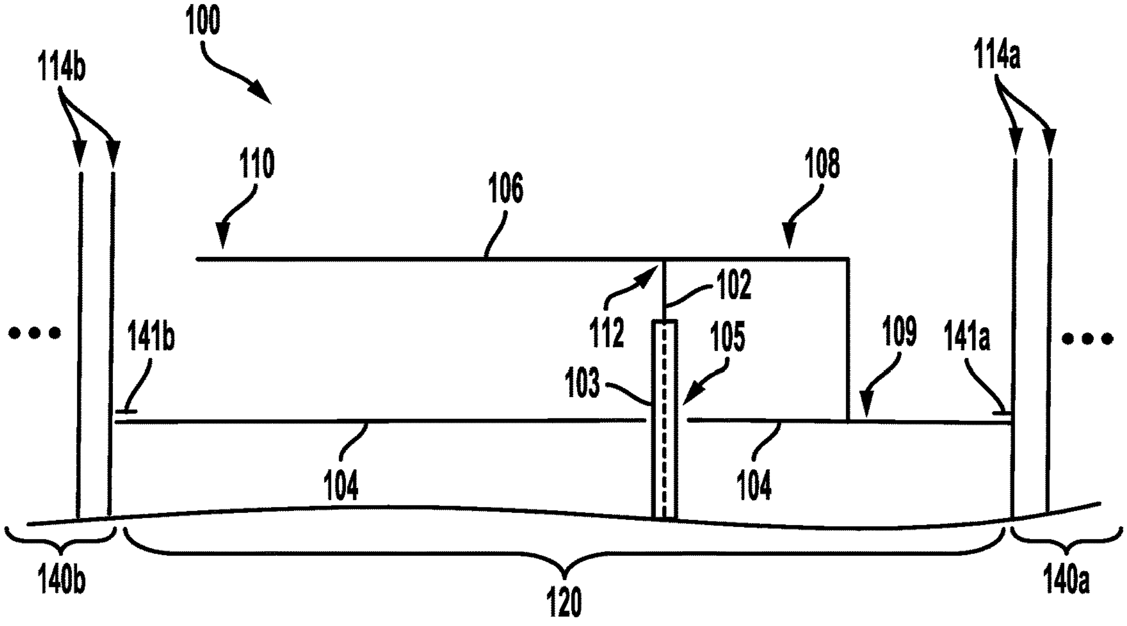
FIG. 1B is a front elevation view of the integrated heatsink and antenna structure of FIG. 1A in accordance with various embodiments.

FIGS. 1A and 1B illustrate an integrated heatsink and antenna structure 100 in accordance with the embodiments. In particular, the integrated heatsink and antenna structure 100 includes a radio frequency (RF) antenna portion 120 for sending and receiving wireless communications and heatsink portions 140*a*, 140*b* configured to dissipate thermal energy or heat. In addition, RF antenna portion 120 may operate to improve the thermal performance of one or more of the heatsink portions 140*a*, 140*b*.

The RF antenna portion 120 may be (or may be plated with) aluminum, copper, stainless steel, beryllium copper, phosphor bronze or any other similar material or composition. The heatsink portions 140*a*, 140*b* may be (or may be plated with) aluminum, copper, or any other material or composition suitable for dissipating heat. For example, in an embodiment, the RF antenna portion 120 may be copper and the heatsink portions 140*a*, 140*b* may be aluminum.

In the examples illustrated in FIGS. 1A and 1B, the RF antenna portion 120 are formed as a planar inverted-F antenna. In particular, the RF antenna portion 120 may include a feed component 102, a ground plane component 104, and a radiating component 106. The radiating component 106 may have an L-shape, such that one leg of the L extends substantially parallel to and is offset from the ground plane component 104, while a second leg of the L (e.g., formed after a bend in the radiating component 106) extends substantially perpendicular to the first leg toward the ground plane component 104. In addition, one end of the second leg may be attached to or integrally formed with the ground plane component 104 at the grounded end 109.

In some embodiments (e.g., embodiments in which an antenna portion 120 is not formed as a planar inverted-F antenna, etc.), a monopole could be designed with the heat sink as ground reference. Further, some embodiments may include a ground plane independent primary radiator (e.g. dipole, etc.) that uses the heatsink as a field shaping structure (dish on a dish antenna).

Returning to examples illustrated in FIGS. 1A and 1B, the feed component 102 may be electrically coupled to a computing device (not illustrated), in which the integrated heatsink and antenna structure 100 is included. Also, the feed component 102 may be fixedly secured (e.g., soldered) to the radiating component 106 at a feed point 112. In this way, the feed component 102 extends from the feed point 112, through an aperture 105 in the ground plane component 104, and to a physical connection with the computing device. The feed component 102 may include a casing or sheathing 105 that insolates the feed component 102. The feed point 112 may be disposed between a shorted portion 108 and a radiating portion 110 of the radiating component 106. The shorted portion 108 may extend away from the feed point 112, substantially parallel to the ground plane component 104 until the bend, beyond which the remainder of the shorted portion 108 extends toward the ground plane component 104 such that the grounded end 109 ends in contact with the ground plane component 104. In this way, the shorted portion 108 may be configured to electrically short one end of the radiating component 106 to the ground plane component 104. The radiating portion 110 may extend away from the feed point 112, in the opposite direction from the shorted portion 108, extending substantially parallel to the ground plane component 104, but include a remote end that is not attached to any other component or portion of the integrated heatsink and antenna structure 100.

The heatsink portions 140*a*, 140*b* may each include fin components 114*a*, 114*b* that provide thermal resistance and additional surface area for improved thermal performance. The first fin of heatsink portion 140*b* may provide capacitive tuning to the open end of the 2.4 GHz patches. This may allow the patches to be smaller that would be the case without the fin.

In various embodiments, the fin components 114*a*, 114*b* may be (or may be plated with) aluminum, copper, or any other material or composition suitable for dissipating heat. In addition, the fin components 114*a*, 114*b* may be formed of a material suitable for also enhancing one or more antenna properties (e.g., radiation patterns, radiation efficiency, bandwidth, input impedance, polarization, directivity, gain, beam-width, voltage standing wave ratio, etc.) of the RF antenna portion 120. A greater or fewer number of fin components 114*a*, 114*b* may be included as part of the heatsink portions 140*a*, 140*b* (i.e., illustrated as ellipses on the outer right and left sides of FIG. 1B).

The ground plane component 104 may be coupled to one or more of the fin components 114*a*, 114*b* and/or arranged to dissipate additional thermal energy and further improve thermal performance, similar to the fin components 114*a*, 114*b*. For example, an innermost one of each of the fin components 114*a*, 114*b* may include tabs 141*a*, 141*b* that hold the ground plane component 104 in place. Additional components may bias the ground plane component 104 into contact with the tabs 141*a*, 141*b*, thus securing (i.e., holding) the RF antenna portion 120 and the heatsink portions 140*a*, 140*b* together. Alternatively, a clip or slot may be provided on or in the innermost ones of the fin components 114*a*, 114*b* for securing the ground plane component 104 to the fin components 114*a*, 114*b*. In this way, securing the ground plane component 104 to the fin components 114*a*, 114*b* couples the RF antenna portion 120 to the heatsink portions 140*a*, 140*b*. Also, this coupling may produce a synergistic effect of providing an RF antenna portion 120 that improves the thermal performance of the heatsink portions 140_a_, 140_b_, as well as heatsink portions 140_a_, 140_b_ that improve the antenna properties of the RF antenna portion 120.

The computing device, in which the integrated heatsink and antenna structure 100 is included, may dissipate the same amount of heat and/or achieve the same thermal performance as conventional devices that have larger structures that include larger or a greater number of fin components that occupy more area. In accordance with various embodiments, the integrated heatsink and antenna structure 100 may be packaged into a smaller or more compact container and/or to include additional or more powerful components (e.g., additional antennas, more powerful processors that generate more heat, etc.) than conventional devices.

Figure 2A:
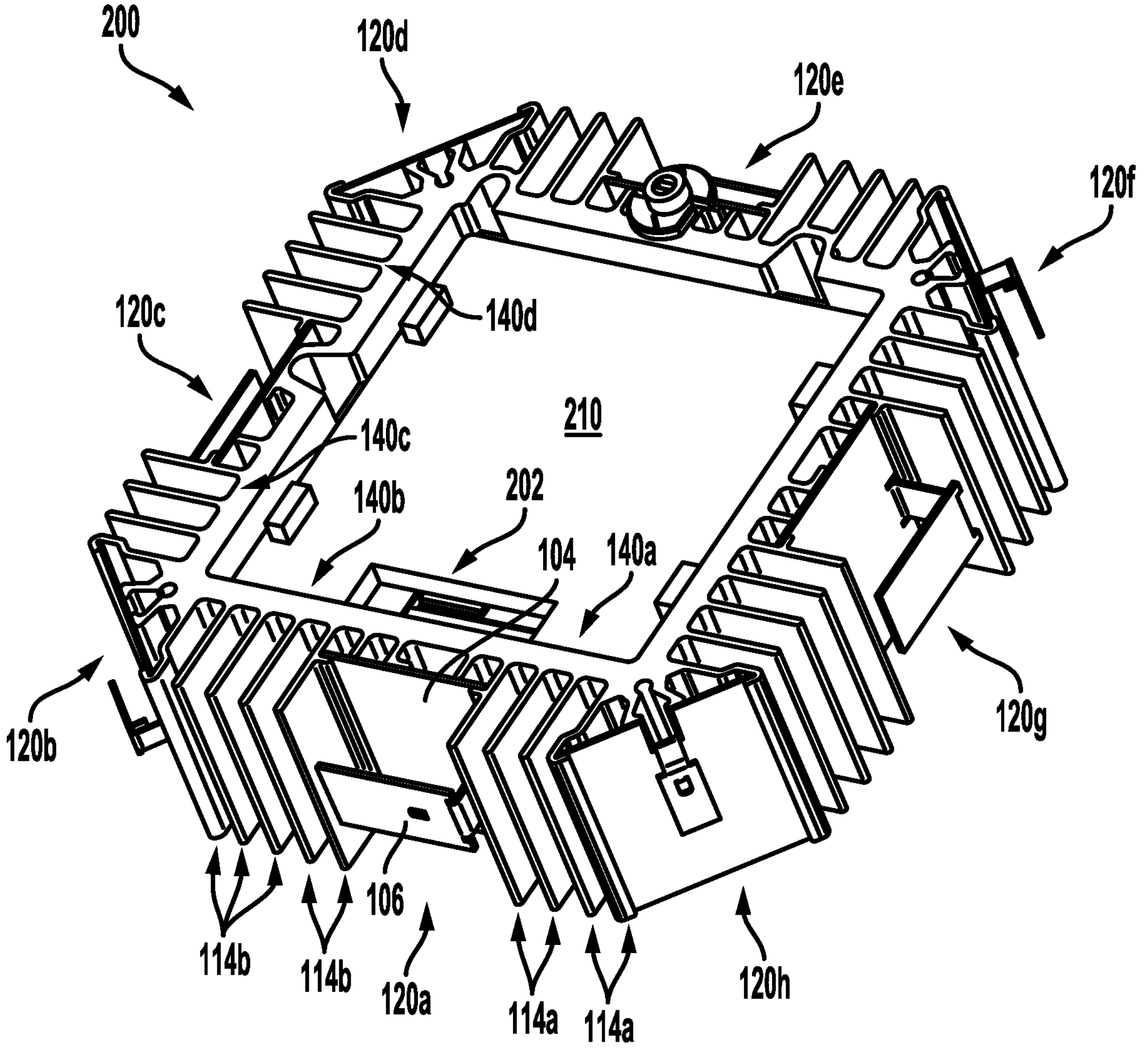
FIGS. 2A-C are isometric, top, and side views, respectively of an integrated heatsink and antenna structure that include multiple radio frequency (RF) antennas with corresponding heat sink portions in accordance with some embodiments.
Figure 2B:
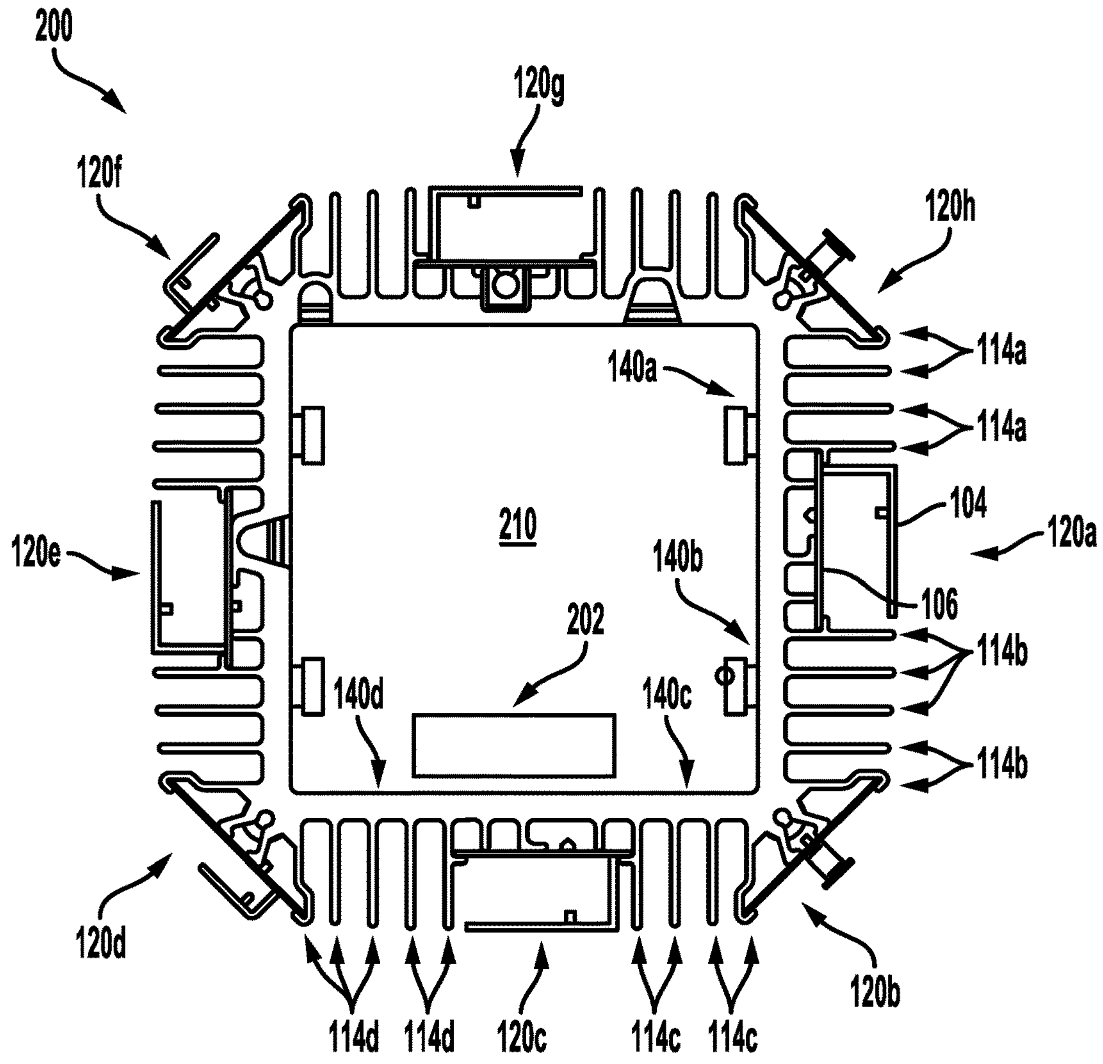
Figure 2C:
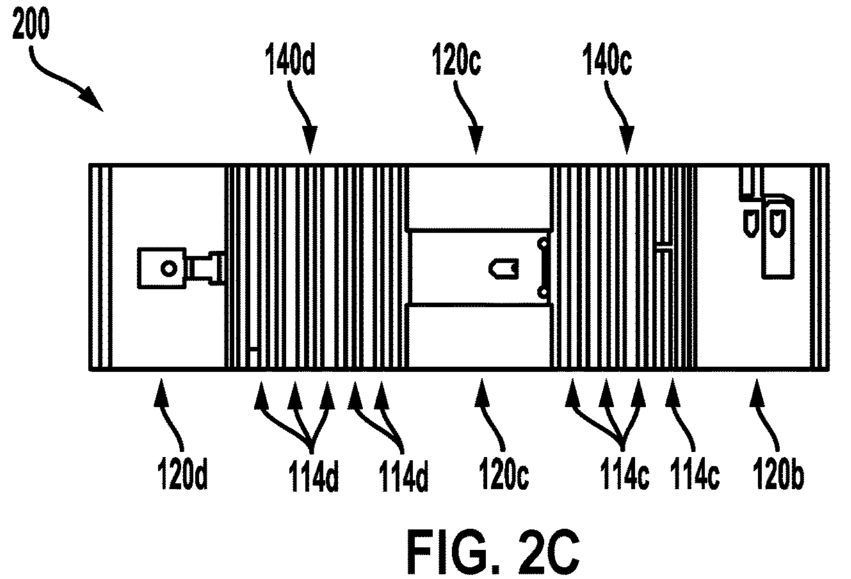

FIGS. 2A-2C illustrate an integrated heatsink and antenna structure 200 that includes multiple sets of the integrated heatsink and antenna structure 100 described above with regard to FIG. 1, in accordance with some embodiments. The integrated heatsink and antenna 200 may include numerous antennas. In the illustrated examples, the integrated heatsink and antenna structure 200 includes eight (8) RF antenna portions 120_a-h_ coupled to a heatsink base 210. The heatsink base 210 may improve the omnidirectional pattern of the antenna portions (120_a-h_).

Each of the RF antenna portions 120_a-h_ may be coupled to and surrounded by fin components (e.g., 114_a-d_) integrated into the heatsink base 210 and that dissipate thermal energy. For example, four (4) of the RF antenna portions 120_a_, 120_c_, 120_e_, 120_g_ may be disposed on the sides of the integrated heatsink and antenna structure 200, each having a similar configuration to that described with regard to integrated heatsink and antenna structure 100 in FIGS. 1A and 1B. In contrast, four (4) more of the RF antenna portions 120_b_, 120_d_, 120_f_, 120_h_ may be disposed on the corners of the integrated heatsink and antenna structure 200, each flanked by sets of fin components (e.g., 114_b_, 114_c_), but those flanking fin components may be disposed on two different sides of the integrated heatsink and antenna structure 200.

The integrated heatsink and antenna structure 200 may include a cavity onto which a processor, computing system, printed circuit board, integrated circuit (IC) chips, a system on chip (SOC), or system in a package (SIP) and/or other similar components may be implemented or placed. In some embodiments, the integrated heatsink and antenna structure 200 may include a connector port 202 that provides an interface between components of the integrated heatsink and antenna structure 200 and other computers or peripheral devices.

In some embodiments, the components/chips may be placed on a heat conducting material (not illustrated separately in FIGS. 2A-C) that is placed on top of the cavity (or aluminum housing) to help with the heat transfer and to address any imperfections that arise during manufacturing.

In some embodiments, the integrated heatsink and antenna structure 200 may dissipate between approximately 15 to 20 Watts/mm$^2$ (or Watts/inch) from the chip to the integrated heatsink and antenna structure 200, from the integrated heatsink and antenna structure 200 to ambient air, and/or from the chip to ambient air.

As mentioned above, the integrated heatsink and antenna structure 200 may include multiple RF antennas 120_a-h_. The RF antennas 120_a-h_ may include wideband, multiband, and/or ultrawideband (UWB) antennas. For example, the RF antennas 120_a-h_ may include patch antennas, inverted-L antennas, inverted-F antennas (e.g., planar inverted-F antenna (PIFA), dual frequency PIFA, etc.) or any other antenna suitable for wireless applications. In some embodiments, the RF antennas 120_a-h_ and/or the antenna pattern may be selected based on heatsink characteristics (size, area, amount of heat metal, etc.).

As mentioned above, securing the ground plane component 104 to the fin components 114_a_, 114_b_ couples the RF antenna portions 120 to the heatsink portion. In the various embodiments, the ground plane for any of the RF antenna portions 120 may be changed so that it is potentially smaller than shown in the figures, but running the entire length behind the heatsink fin components 114.

In some embodiments, the fin components 114 may be arraigned into a fin structure that is slightly different for each RF antenna portion 120_a-h_ or for each antenna location. In some embodiments, each of the RF antenna portions 120 may be tuned for frequency band and/or modified based on frequency, bandwidth, impedance, proximity to the fin components 114 and/or the corresponding fin structure.

Figure 3:
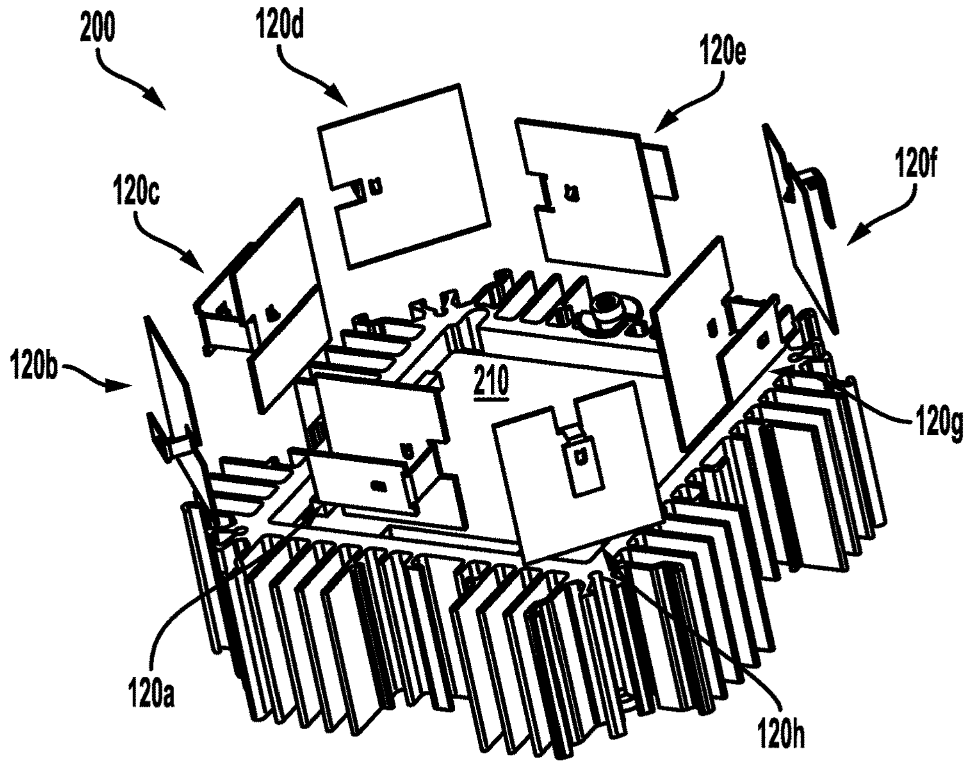
FIG. 3 is a partially exploded isometric view of the integrated heatsink and antenna structure of FIG. 2A.

FIG. 3 illustrates a partially exploded view of the integrated heatsink and antenna structure 200. As shown, the RF antenna portions 120_a-h_ may be separated from and/or attached to the heatsink base component 210 using securing structures incorporated into some of the fin components.

In some embodiment, the antenna elements/portions may be formed curved of a springy material. The heat sink features may hold the antenna elements/portions flat so that friction (primarily) holds them in place. As such, the RF antenna portions 120_a-h_ may be attached to the heatsink base component 210 via a friction fit. In addition, the integrated heatsink and antenna structure 200 may be formed to fit into a plastic housing (not illustrated separately in FIG. 3) that has features that ensure location of the radiating element so that the antennas do not become detuned by having the structure bent out of shape.

Figure 4:
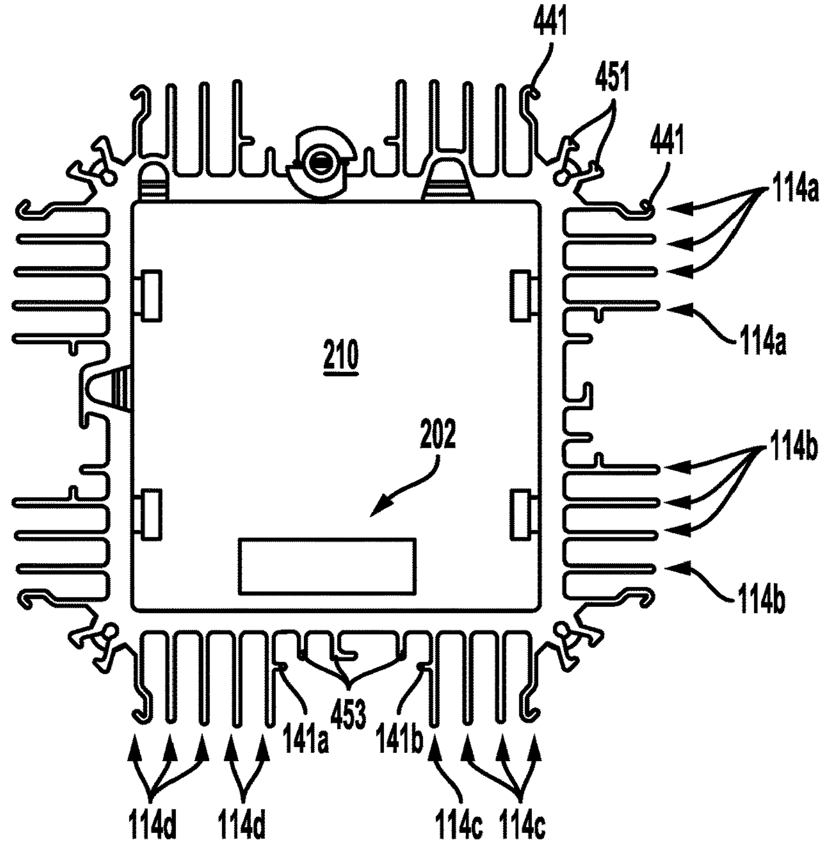
FIG. 4 is an isolated top view of a heatsink base component in accordance with various embodiments.

FIG. 4 illustrates the heatsink base component 210 in accordance with various embodiments. In particular, FIG. 4 shows some of the retaining structures that may be incorporated into some of the fin components for holding and retaining the RF antenna portions (e.g., 120_a-h_). For example, the corner fin components may have hooked ends 441 such that the hooked ends 441 on a pair of opposed corner fin components may bend toward one another. The hooked ends 441 may be used to secure or trap an RF antenna portion (or components thereof). The RF antenna portion may also be supported by corner mini-fins 451 that project out toward the RF antenna portion. In this way, each of the RF antenna portions on the corners of the heatsink base component 210 may be trapped between a pair of the hooked ends 441 and a set of the corner mini-fins 451. Similarly, the RF antenna portions on the sides of the heatsink base component 210 may be trapped between a pair of the tabs 141_a_, 141_b_ and a set of additional mini-fins 453.

Figure 5A:
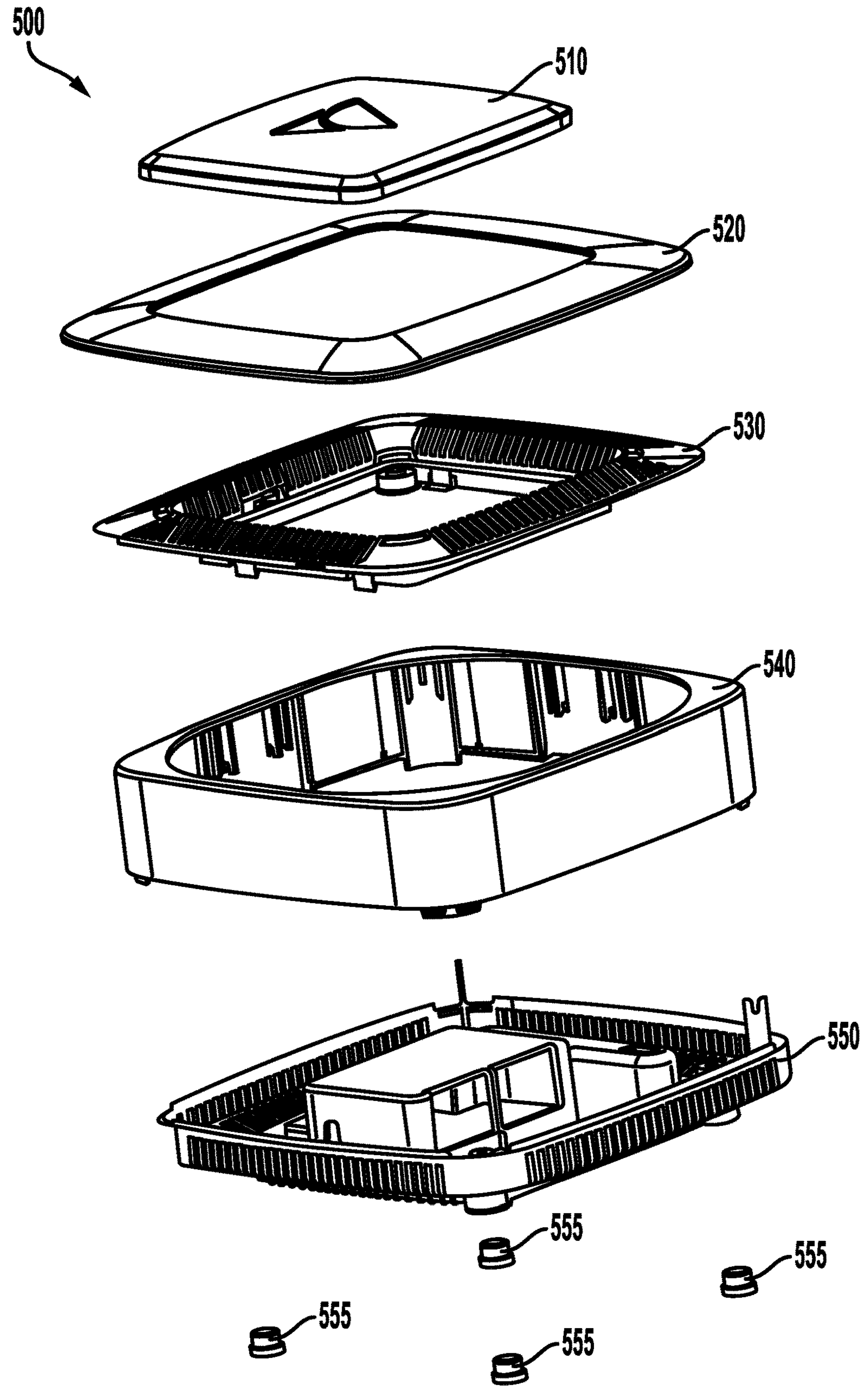
FIGS. 5A and 5B are exploded and assembled isometric views, respectively, of a stackable housing for an integrated heatsink and antenna structure in accordance with various embodiments.
Figure 5B:
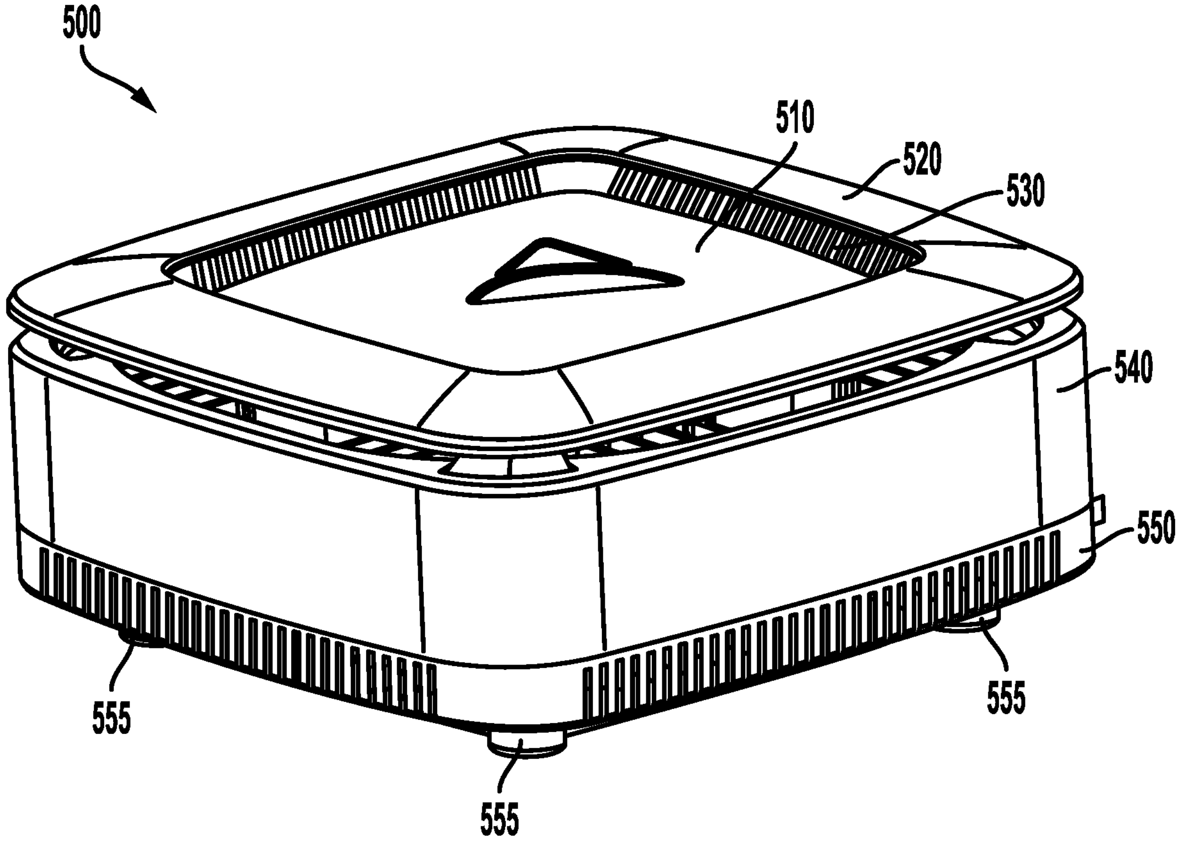

FIGS. 5A and 5B illustrate a stackable housing 500 for an integrated heatsink and antenna structure in accordance with various embodiments. The stackable housing 500 may include a lid 510, an upper rim 520, an upper tray 530, a housing casing 540, housing base 550, and housing feet 555. In accordance with various embodiments, the integrated heatsink and antenna structure (e.g., 200) may be seated on top of the housing base 550. Once the integrated heatsink and antenna structure 200 is mounted on the housing base 550, the housing casing 540 may be slipped over and surround the integrated heatsink and antenna structure 200. The lid 510, upper rim 520, and upper tray 530 may then close off the assembly by being secured on top of the housing casing 540. Additional components and/or circuitry may be located between the integrated heatsink and antenna structure and the housing base 550. Similarly, components and/or circuitry may be located between the lid 510 and the upper tray 530.

Figure 6:
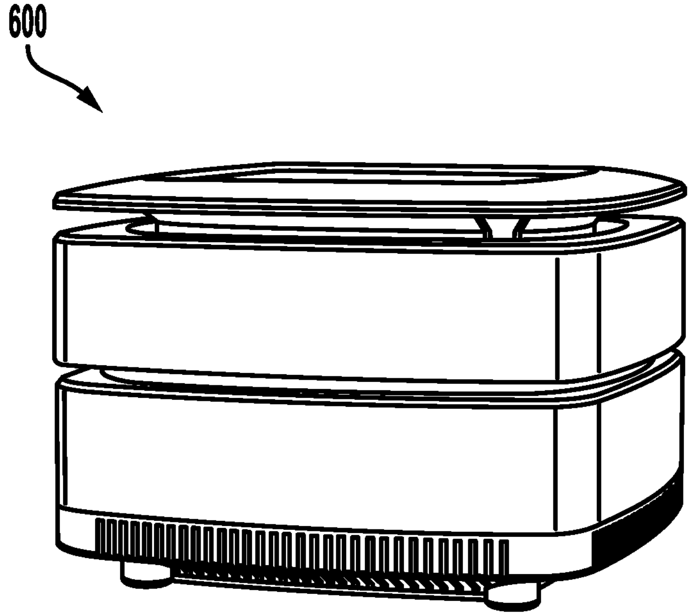
FIG. 6 is an isometric view of two of the stackable housings shown in FIGS. 5A and 5B stacked on top of and couple to one another in accordance with various embodiments.

In various embodiments, the stackable housing 500 may be stacked on top of or below another stackable housing 500, which then allows multiple integrated heatsink and antenna structures (e.g., 200) to be used together in a compact arrangement. To stack the stackable housings 500, the lid 510, upper rim 520, and upper tray 530 of all but the uppermost stackable housing 500 are removed, which may expose one integrated heatsink and antenna structure below to another integrated heatsink and antenna structure above. For example, FIG. 6 illustrates two of the stackable housings shown in FIGS. 5A and 5B stacked on top of and couple to one another in accordance with various embodiments.

Figure 7:
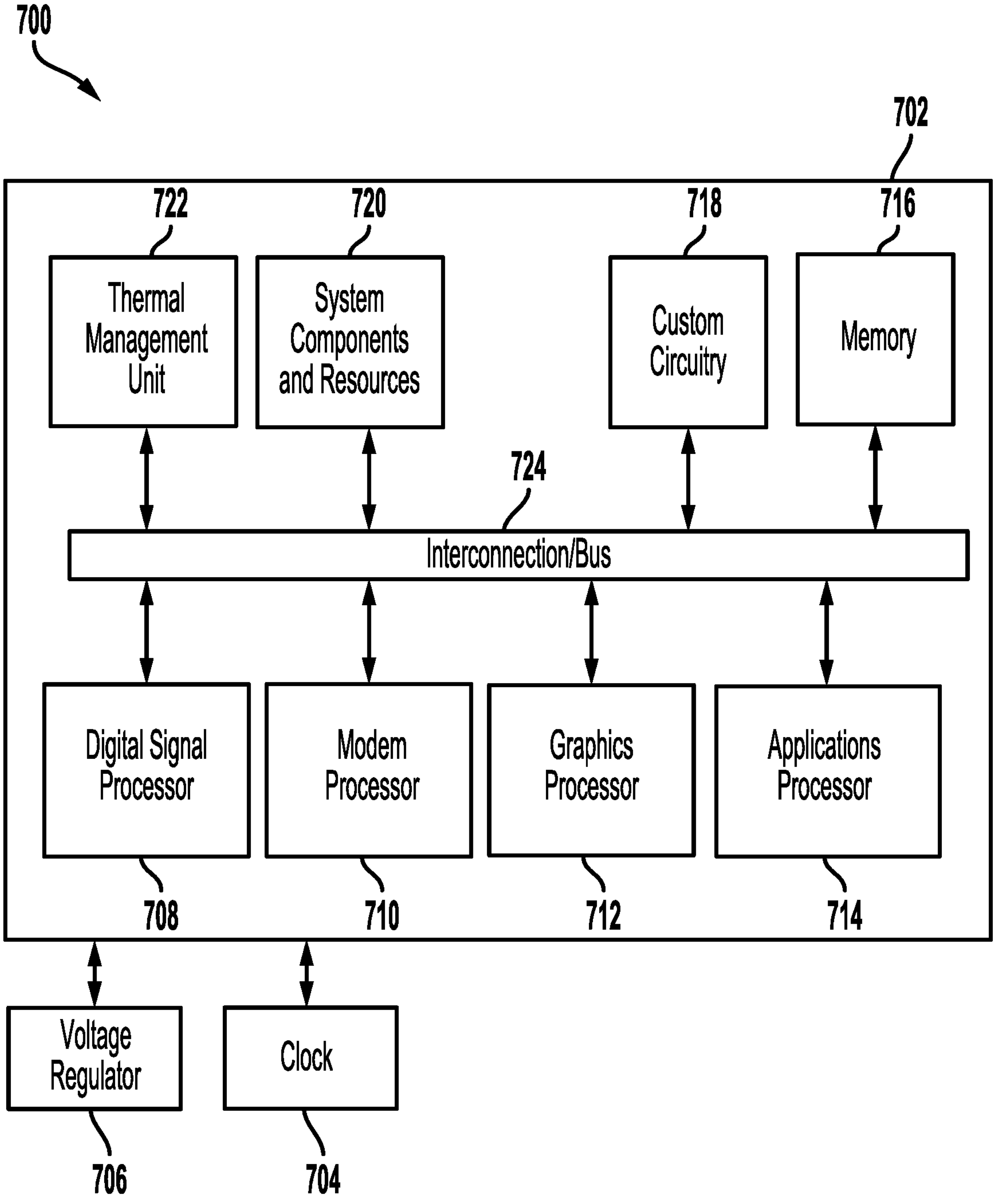
FIG. 7 is a component block diagram illustrating a computing system that could benefit from the improved thermal performance and/or improved antenna properties provided by the integrated heatsink and antenna structure.

FIG. 7 illustrates an example computing system 700 that may be used with integrated heatsink and antenna structure 200 in accordance with some embodiments. In the example illustrated in FIG. 7, the computing system 700 includes an SOC 702, a clock 704, and a voltage regulator 706.

In overview, an SOC may be a single IC chip that contains multiple resources and/or processors integrated on a single substrate. A single SOC may contain circuitry for digital, analog, mixed-signal, and radio-frequency functions. A single SOC may also include any number of general purpose and/or specialized processors (packet processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices. The components in an SOC may generate a significant amount of thermal energy or heat, and thus the placement of the components within the SOC, the location of the SOC within the integrated heatsink and antenna structure 200, and other thermal management considerations are often important.

With reference to FIG. 7, the SOC 702 may include a digital signal processor (DSP) 708, a modem processor 710, a graphics processor 712, an application processor 714 connected to one or more of the processors, memory 716, custom circuitry 718, system components and resources 720, a thermal management unit 722, and an interconnection/bus module 724. The SOC 702 may operate as central processing unit (CPU) that carries out the instructions of software application programs by performing the arithmetic, logical, control and input/output (I/O) operations specified by the instructions.

The thermal management unit 722 may be configured to monitor and manage the device's junction temperature, surface/skin temperatures and/or the ongoing consumption of power by the active components that generate thermal energy in the device. The thermal management unit 722 may determine whether to throttle the performance of active processing components (e.g., CPU, GPU, LCD brightness), the processors that should be throttled, the level to which the frequency of the processors should be throttled, when the throttling should occur, etc.

The system components and resources 720 and custom circuitry 718 may manage sensor data, analog-to-digital conversions, wireless data transmissions, and perform other specialized operations, such as decoding data packets and processing video signals. For example, the system components and resources 720 may include power amplifiers, voltage regulators, oscillators, phase-locked loops, peripheral bridges, temperature sensors (e.g., thermally sensitive resistors, negative temperature coefficient (NTC) thermistors, resistance temperature detectors (RTDs), thermocouples, etc.), semiconductor-based sensors, data controllers, memory controllers, system controllers, access ports, timers, and other similar components used to support the processors and software clients running on a device. The custom circuitry 718 may also include circuitry to interface with other computing systems and peripheral devices, such as wireless communication devices, external memory chips, etc.

Each processor 708, 710, 712, 714 may include one or more cores, and each processor/core may perform operations independent of the other processors/cores. For example, the SOC 702 may include a processor that executes a first type of operating system (e.g., FreeBSD, LINUX, OS X, etc.) and a processor that executes a second type of operating system (e.g., MICROSOFT WINDOWS 10). In addition, any or all of the processors 708, 710, 712, 714 may be included as part of a processor cluster architecture (e.g., a synchronous processor cluster architecture, an asynchronous or heterogeneous processor cluster architecture, etc.).

The processors 708, 710, 712, 714 may be interconnected to one another and to the memory 718, system components and resources 720, and custom circuitry 718, and the thermal management unit 722 via the interconnection/bus module 724. The interconnection/bus module 724 may include an array of reconfigurable logic gates and/or implement a bus architecture (e.g., CoreConnect, AMBA, etc.). Communications may be provided by advanced interconnects, such as high-performance networks-on chip (NoCs).

The SOC 702 may further include an input/output module (not illustrated) for communicating with resources external to the SOC, such as the clock 704 and the voltage regulator 706. Resources external to the SOC (e.g., clock 704, etc.) may be shared by two or more of the internal SOC processors/cores.

In addition to the SOC 702 discussed above, the various embodiments may include or may be implemented in a wide variety of computing systems, which may include a single processor, multiple processors, multicore processors, or any combination thereof.

The processors may be any programmable microprocessor, microcomputer or multiple processor chip or chips that can be configured by software instructions (applications) to perform a variety of functions, including the functions of the various aspects described in this application. In some wireless devices, multiple processors may be provided, such as one processor dedicated to wireless communication functions and one processor dedicated to running other applications. Typically, software applications may be stored in the internal memory 906 before they are accessed and loaded into the processor. The processor may include internal memory sufficient to store the application software instructions.

As mentioned above (e.g., with reference to FIGS. 2B and 4, etc.), in some embodiments the heatsink base component 210 may include mini-fins 453 that secure or trap side RF antenna portions (e.g., RF antenna portions 120*a*, 120*c*, 120*e* and 120*g*, etc.) or components thereof. In other embodiments, the RF antenna portions may be located only on the corners of the heatsink base component 210.

Figure 8:
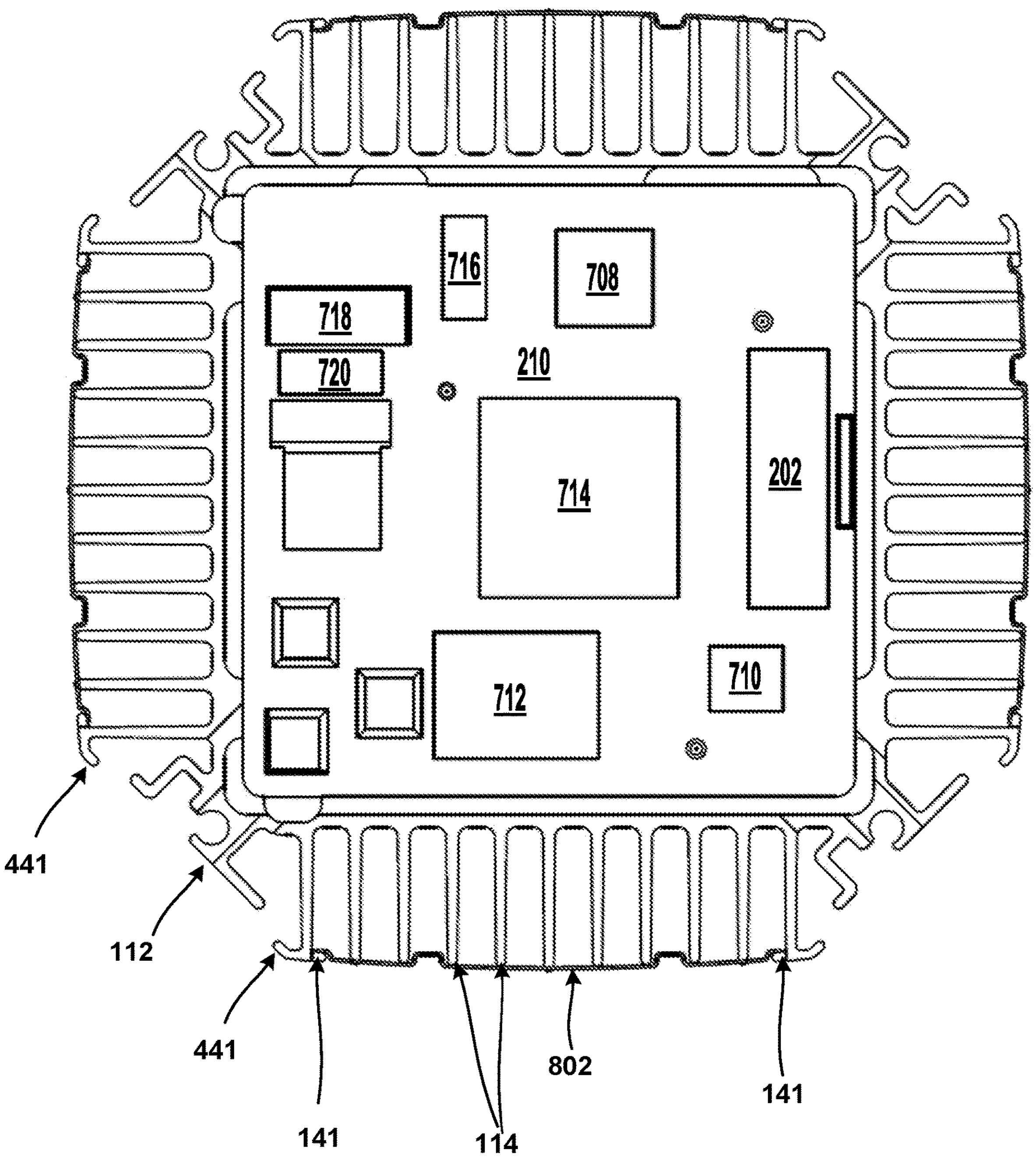
FIG. 8 is a top view of an integrated heatsink and antenna structure that includes multiple radio frequency antennas with corresponding heat sink portions in accordance with some embodiments.

FIG. 8 illustrates an integrated heatsink and antenna structure in which the RF antenna portions are located on the corners but not the sides. Rather than mini-fins 453 (illustrated in FIG. 4), the side portions include full-sized fin components 114 that provide thermal resistance and additional surface area for improved thermal performance. The fin components 114 also secure a grounding plate 802 that couples the RF antenna portions 120 to the heatsink portions of the integrated heatsink and antenna structure. As such, the grounding plate 802 enhances the thermal performance of the heatsink portions, enhances the radio properties of the RF antenna portions, and/or improves the performance of the SOC components (e.g., components 708-720). In the example illustrated in FIG. 8, the integrated heatsink and antenna structure also includes a connector port 202 that provides an interface between components of the integrated heatsink and antenna structure and other computers or peripheral devices.

In some embodiments, the integrated heatsink and antenna structure may include retaining structures. The retaining structures may be incorporated into some of the fin components for holding and retaining the RF antenna portions. For example, the corner fin components may have hooked ends 441 such that the hooked ends 441 on a pair of opposed corner fin components may bend toward one another. The hooked ends 441 may be used to trap an RF antenna portion. The RF antenna portion may also be supported by corner mini-fins or similar structures that project out toward the RF antenna portion. In this way, each of the RF antenna portions on the corners of the heatsink base component may be trapped between a pair of the hooked ends 441 and a set of the corner fins.

As mentioned above, the grounding plate 802 may be coupled to one or more of the fin components 114 and/or arranged to dissipate additional thermal energy and further improve thermal performance, similar to the fin components 114.

Some of the fin components 114 may include tabs 141 that hold the ground plane component 104 in place. Additional components may bias the grounding plate 802 into contact with the tabs 141, thus securing (i.e., holding) or trapping the grounding plate 802 to the heatsink portion and/or to a corner antenna portion. Alternatively, a clip or slot may be provided on or in one or more of the fin components for securing the grounding plate 802 to the fin components. This coupling may produce a synergistic effect of extending an RF antenna portion that improves the thermal performance of the heatsink portions and/or improves its radio properties (e.g., radio patterns).

Figure 9A:
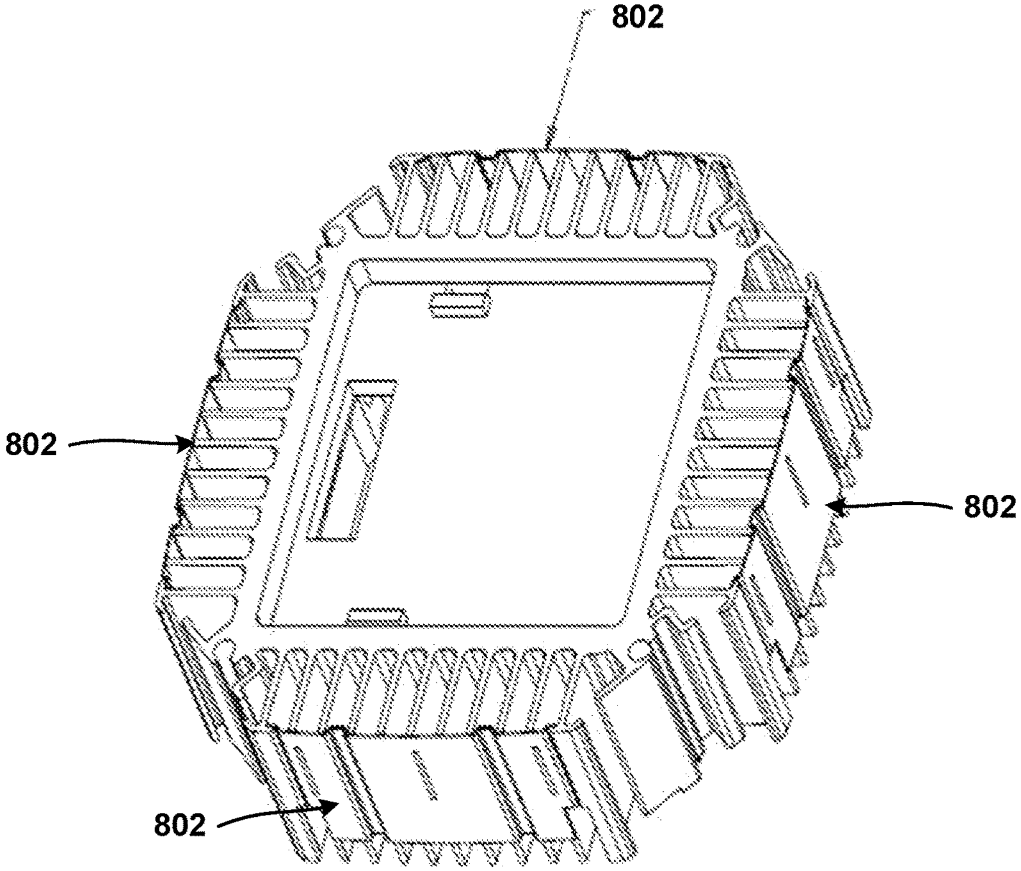
FIGS. 9A-B are top and bottom isometric views of an integrated heatsink and antenna structure that include multiple radio frequency antennas with corresponding heat sink portions in accordance with some embodiments.
Figure 9B:
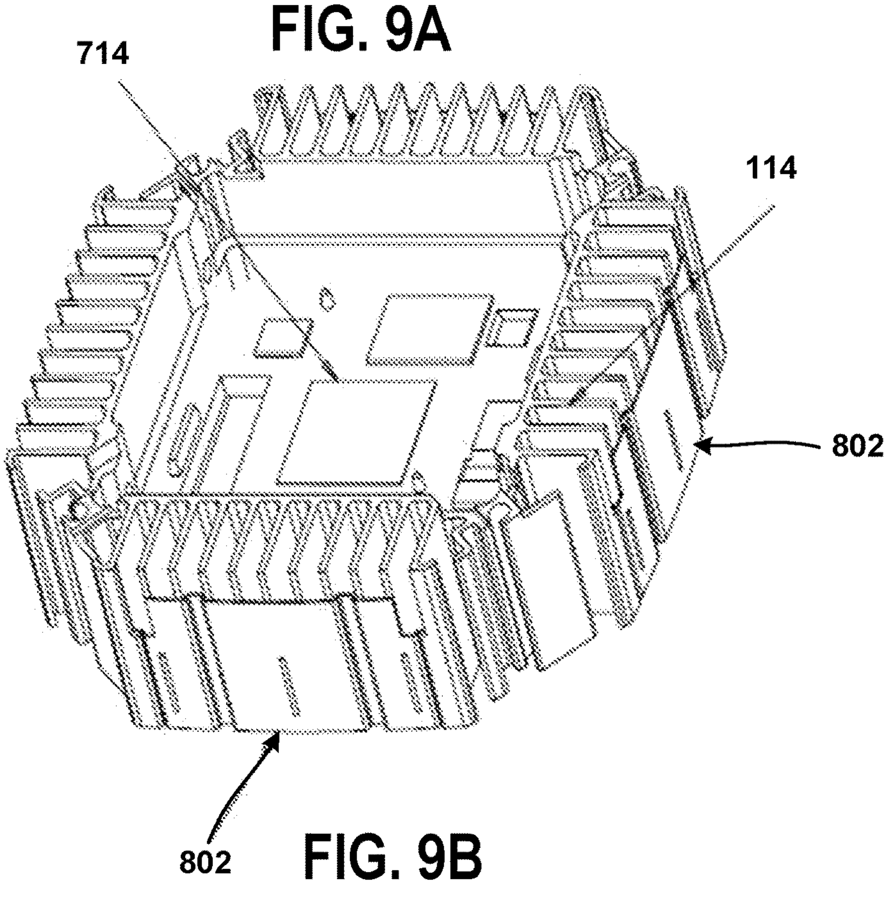

FIGS. 9A and 9B are isometric views that illustrate that a grounding plate 802 may be integrated into each side of the integrated heatsink and antenna structure.

Figure 10A:
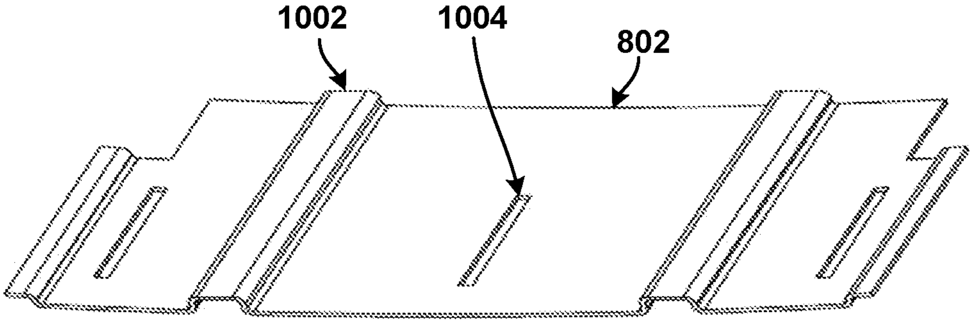
FIGS. 10A-C are isometric, top, and side views, respectively of a grounding plate (grounding plane component) that is suitable for use in the integrated heatsink and antenna structure in accordance with some embodiments.
Figure 10B:
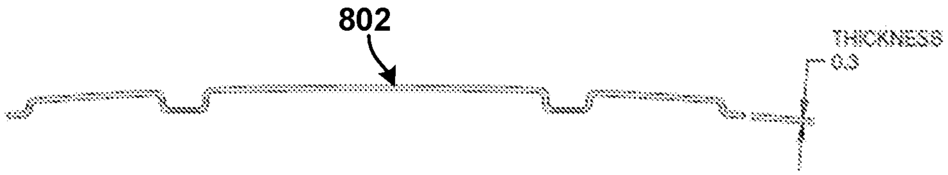
Figure 10C:
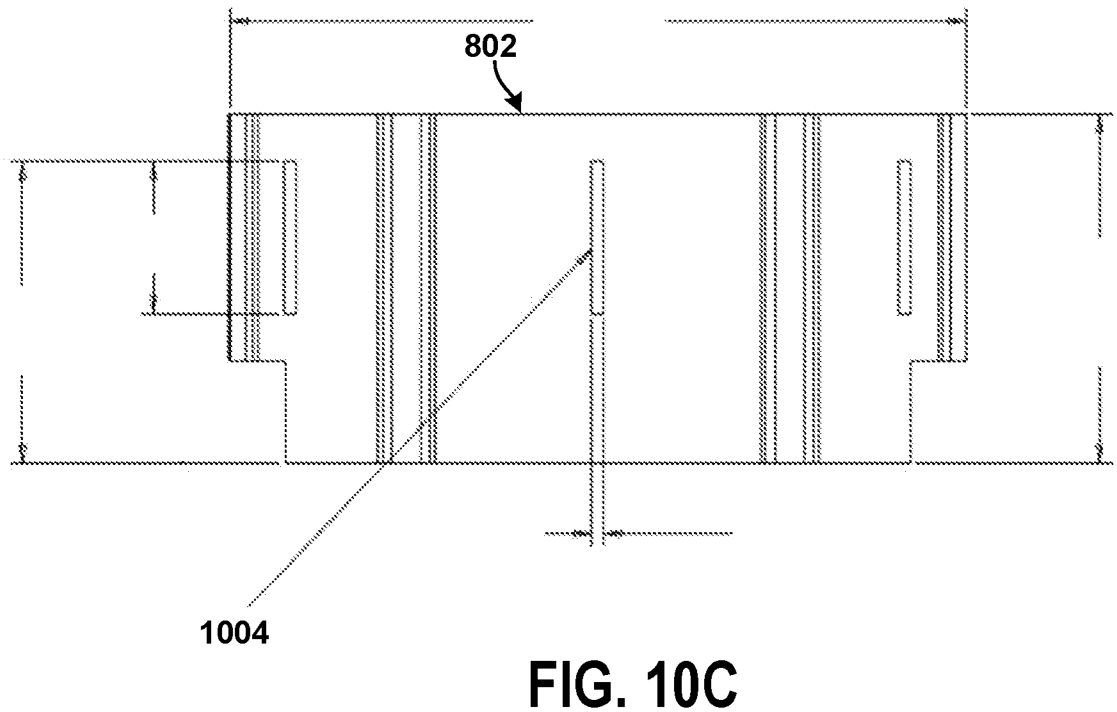

FIGS. 10A-10C are illustrations of the grounding plate 802 in accordance with some embodiments. The grounding plate 802 may include ridges 1002 and slots 1004, any or all of which function to improve radio properties (e.g., radio patterns) of the RF antenna portions. For example, the center slot 1004 illustrated in FIG. 10C may operate to improve the radio properties (e.g., radio patterns, etc.) of RF antenna portions of the integrated heatsink and antenna structure (e.g., by further tuning the antenna, etc.).

As used in this application, the terms "component," "module," "system," and the like may refer to a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

Various aspects illustrated and described are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. An integrated heatsink and antenna structure, comprising:
- a plurality of fin components that dissipate thermal energy integrated into a heatsink base;
- a plurality of radio frequency antenna portions coupled to and surrounded by the fin components, wherein:
  - the plurality of radio frequency antenna portions form a monopole antenna;
  - the heatsink base operates as a ground reference for each of the plurality of the antenna portions;
  - the heatsink base operates to improve an omnidirectional pattern of each of the plurality of the antenna portions;
  - at least one of the plurality of fin components includes a tab that holds at least one of the plurality of radio frequency antenna portions in place; and
  - at least one of the plurality of fin components provides capacitive loading to an open end of a radiating element of at least one of the plurality of radio frequency antenna portions.

2. The integrated heatsink and antenna structure of claim 1, wherein a top portion of the heatsink base includes a cavity that holds a computing system, a processor printed circuit board, an integrated circuit (IC) chip, a system on chip (SOC), or system in a package (SIP).

3. The integrated heatsink and antenna structure of claim 1, wherein the plurality of radio frequency antenna portions improve the thermal performance of the heatsink base.

4. The integrated heatsink and antenna structure of claim 1, wherein the heatsink base improves:
- radiation patterns of the plurality of radio frequency antenna portions;
- radiation efficiency of the plurality of radio frequency antenna portions;
- bandwidth of the plurality of radio frequency antenna portions;
- input impedance of the plurality of radio frequency antenna portions;
- polarization of the plurality of radio frequency antenna portions;
- directivity of the plurality of radio frequency antenna portions;
- gain of the plurality of radio frequency antenna portions;
- beam-width of the plurality of radio frequency antenna portions; or
- voltage standing wave ratio of the plurality of radio frequency antenna portions.

5. The integrated heatsink and antenna structure of claim 1, wherein the plurality of radio frequency antenna portions increase the heatsink surface area of the heatsink base.

6. The integrated heatsink and antenna structure of claim 1, wherein the plurality of radio frequency antenna portions are configured to transmit or receive wireless communications and provide a path for dissipating thermal energy or heat.

7. The integrated heatsink and antenna structure of claim 1, wherein all or portions of the integrated heatsink and antenna structure are made of aluminum or copper.

8. The integrated heatsink and antenna structure of claim 1, wherein:
- heatsink base includes four side surfaces; and
- each of the four side surfaces is coupled to two or more of the plurality of radio frequency antenna portions.

9. The integrated heatsink and antenna structure of claim 8, wherein each of the plurality of radio frequency antenna portions further includes a grounding plate fixedly secured to one of the four side surfaces.

10. A computing device, comprising:
- an integrated heatsink and antenna structure comprising:
  - a plurality of fin components that dissipate thermal energy integrated into a heatsink base;
  - a plurality of radio frequency antenna portions coupled to and surrounded by the fin components, wherein:
    - the plurality of radio frequency antenna portions form a monopole antenna;
    - the heatsink base operates as a ground reference for each of the plurality of the antenna portions;
    - the heatsink base operates to improve an omnidirectional pattern of each of the plurality of the antenna portions;
    - at least one of the plurality of fin components includes a tab that holds at least one of the plurality of radio frequency antenna portions in place; and
    - at least one of plurality of fin components provides capacitive loading to an open end of a radiating element of at least one of the plurality of radio frequency antenna portions.

11. The computing device of claim 10, wherein a top portion of the heatsink base includes a cavity that holds a processor printed circuit board, an integrated circuit (IC) chip, a system on chip (SOC), or system in a package (SIP).

12. The computing device of claim 10, wherein the plurality of radio frequency antenna portions improve the thermal performance of the heatsink base.

13. The computing device of claim 10, wherein the heatsink base improves:

radiation patterns of the plurality of radio frequency antenna portions;

radiation efficiency of the plurality of radio frequency antenna portions;

bandwidth of the plurality of radio frequency antenna portions;

input impedance of the plurality of radio frequency antenna portions;

polarization of the plurality of radio frequency antenna portions;

directivity of the plurality of radio frequency antenna portions;

gain of the plurality of radio frequency antenna portions;

beam-width of the plurality of radio frequency antenna portions; or voltage standing wave ratio of the plurality of radio frequency antenna portions.

14. The computing device of claim 10, wherein the plurality of radio frequency antenna portions increase the heatsink surface area of the heatsink base.

15. The computing device of claim 10, wherein the plurality of radio frequency antenna portions are configured to transmit or receive wireless communications and provide a path for dissipating thermal energy or heat.

16. The computing device of claim 10, wherein all or portions of the integrated heatsink and antenna structure are made of aluminum or copper.

17. The computing device of claim 10, wherein:

heatsink base includes four side surfaces; and each of the four side surfaces is coupled to two or more of the plurality of radio frequency antenna portions.

18. The computing device of claim 17, wherein each of the plurality of radio frequency antenna portions further includes a grounding plate fixedly secured to one of the four side surfaces.

* * * * *